United States Patent [19]

Wolf et al.

[11] 3,881,019

[45] Apr. 29, 1975

[54] O-MERCAPTO-BENZAMIDES AS HYPOGLYCEMIA AGENTS

[75] Inventors: Milton Wolf, West Chester; John H. Sellstedt, King of Prussia; Richard L. Fenichel, Wyncote, all of Pa.

[73] Assignee: American Home Products Corporation, New York, N.Y.

[22] Filed: Oct. 10, 1973

[21] Appl. No.: 405,241

Related U.S. Application Data

[62] Division of Ser. No. 232,285, March 6, 1972, Pat. No. 3,829,488.

[52] U.S. Cl. ............... 424/324; 424/248; 424/250; 424/263; 424/267; 424/274; 424/283; 424/308; 424/309; 424/311; 424/321

[51] Int. Cl. ............................................ A61k 27/00

[58] Field of Search ..................................... 424/324

[56] References Cited

OTHER PUBLICATIONS

Gialdi et al., Il Farmaco, Ed. Sc. Vol. XIV pp. 648–665.

Il Farmaco, Ed. Sc. Vol. XIX pp. 515–528 (1964).

*Primary Examiner*—Frederick E. Waddell
*Attorney, Agent, or Firm*—Richard K. Jackson

[57] ABSTRACT

Bis(o-N-substituted carbamylphenyl) disulfides, the mercapto reduction product and pharmaceutically acceptable salts thereof exhibit hypoglycemic activity in warm-blooded animals.

5 Claims, No Drawings

3,881,019

O-MERCAPTO-BENZAMIDES AS HYPOGLYCEMIA AGENTS

RELATED APPLICATION

This application is a division of co-pending parent application Ser. No. 232,285 filed Mar. 6, 1972 now U.S. Pat. No. 3,829,488.

BACKGROUND OF THE INVENTION

In the past, various substituted phenylsulfonyl ureas, substituted biguanides and insulin derivatives have been employed as hypoglycemic agents, U.S. Pat. Nos. 2,538,018; 2,961,377; 2,968,158; 3,041,331 and 3,349,124.

In 1959, F. Gialdi et al. reported in Il Farmaco, Ed. Sc. Vol. XIV, pp. 648–665, the in vitro antimycotic activity of certain members of a series of N-alkyl-, aryl-, and aralkylmono or di-substitued bis-amides of 2,2'-dicarboxydiphenyldisulphide. The N,N-disubstituted amides tested were reportedly inactive. Additional information relative to the use of these compounds as chemical intermediates is reported at Il Farmaco, Ed. Sc. Vol. XIX, pp 515–528 (1964).

BRIEF DESCRIPTION OF THE INVENTION

It has now been found that certain bis(o-N-substituted-carbamylphenyl) disulfides, the corresponding mercapto reduction products and their pharmaceutically acceptable salts reduce the blood sugar level in warm-blooded animals.

Thus, in accordance with this invention there is provided hypoglycemic agents possessing a thiol(—SH) or dithio(—S—S—) group as a benzene ring substituent ortho to a N—substituted carbamyl group. The novel hypoglycemic agents of this invention are represented by the structural formula:

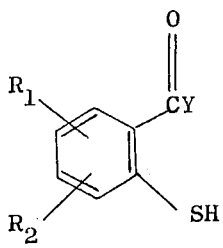

wherein
$R_1$ and $R_2$ are independently selected from the group consisting of -H, lower alkyl, lower alkoxy, aryl of 6 to 10 carbon atoms, aralkyl of 7 to 10 carbon atoms, lower alkoxyaryl of 7 to 14 carbon atoms, 2-pyridyl, —CF$_3$, —F, —Cl, —Br, —I, —NO$_2$, —NH$_2$, —OH, di(lower)alkylamino, carbamyl, sulfamyl, carb(lower)alkoxy, lower alkylthio, lower alkylsulfonyl, carboxymethyl, carboxyl, lower alkanoylamido, and the ortho-fused 1,3-butadienylene radical;
Y is selected from the group consisting of -N(lower alkyl)$_2$;

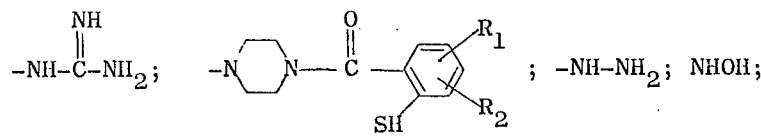

—NH-NH$_2$; NHOH; —NH lower alkoxy; —NH aryl of 6 to 10 carbon atoms; —NH lower alkoxy aryl of 7 to 12 carbon atoms; —NH aralkyl of 7 to 14 carbon atoms; —NH(2-pyridyl); morpholino;

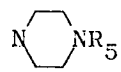

where $R_5$ is lower alkyl, aryl of 6 to 10 carbon atoms, p-chlorophenyl, and aralkyl of 6 to 14 carbon atoms;

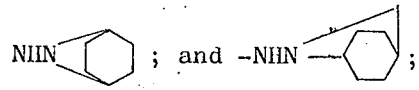

and pharmaceutically acceptable salts thereof.

Of these compounds, those of the depicted structure in which $R_1$ and $R_2$ are independently selected from the group consisting of —H, —F, —Cl, —Br, —I, lower alkyl, lower alkoxy, -CF$_3$, dilower alkylamino, carbamyl, lower alkanoyllamido, and ortho fused 1,3-butadienylene and Y is —N(lower alkyl)$_2$,

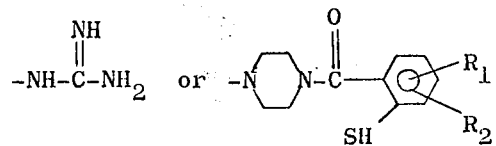

and the pharmaceutically acceptable salts thereof, represent preferred compounds from the standpoint of production, economics and practical application.

Furthermore, in accordance with this invention, there is provided a process for the production of the hypoglycemic agents and for their administration to a hyperglycemic warm-blooded animal.

The hypoglycemic agents of this invention are used by administering them to a warm-blooded animal as a composition containing as the essential active ingredient at least one amide of the formula:

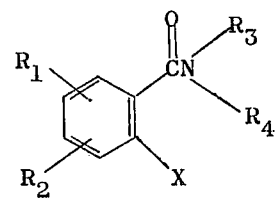

wherein $R_1$ and $R_2$ are defined above;
X is selected from the group consisting of —SH and

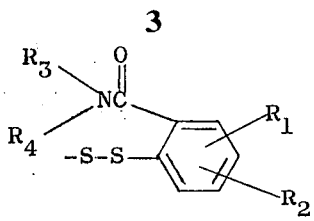

$R_3$ is selected from the group consisting of —H, lower alkyl, and

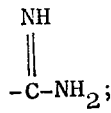

$R_4$ is selected from the group consisting of —H and lower aalkyl; and where $R_3$ and $R_4$ are taken together they form one of the moieties

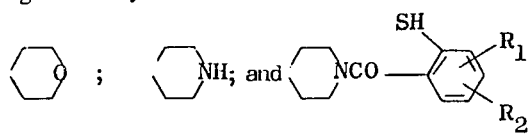

and when X contains the dithio ether group 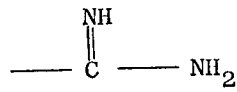, and the pharmaceutically acceptable salts thereof, in an amount sufficient to reduce said blood sugar level.

In the preceding paragraphs and elsewhere throughout this document the term "lower" is used to modify the generic descriptions alkyl, alkoxy, and the like, to denote groups derived from the alkane series which contain from 1 to about 6 carbon atoms. The expression pharmaceutically acceptable salts thereof, is intended to embrace the salts formed with alkali metal cations e.g. $Na^+$, $K^+$, $Rb^+$ and $Cs^+$; the alkaline earth cations e.g. $Ca^{++}$, $Mg^{++}$, $Sr^{++}$; and the transition metal cations such as $Zn^{++}$. In addition to the common metal cations certain organic salt forming compounds which are especially desirable are those presenting the amidine structure $$\begin{array}{c} NH \\ \| \\ —C—NH_2 \end{array}$$

and the —H substituted forms thereof (e.g. acetamidine, guanidine, and isoureas) and tertiary amine salts such as are derived from piperidine, piperazine, pyrrolidine and imidazolidine.

The compounds of this invention may be produced by the following procedure:

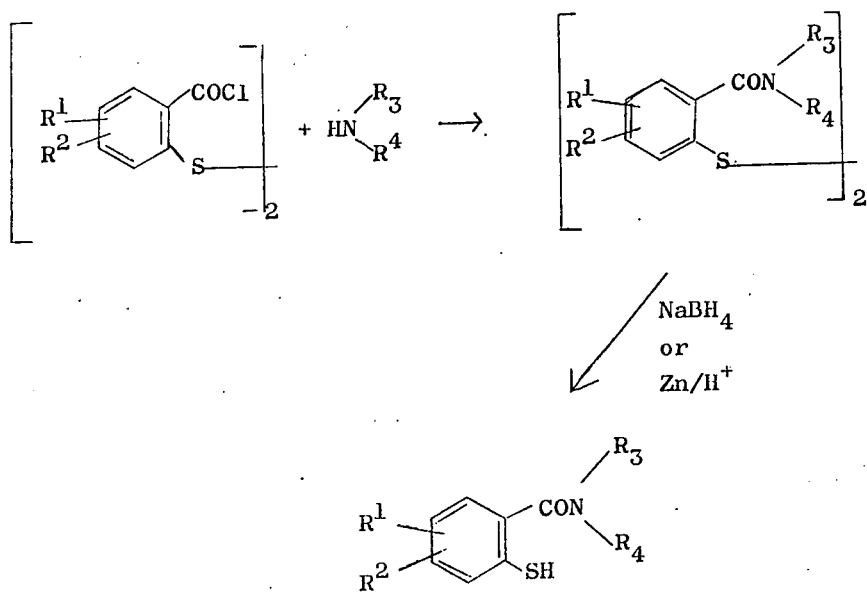

wherein the groups $R_1$, $R_2$, $R_3$ and $R_4$ are as described above. Normally an inert solvent is employed in the first reaction stage. The reaction may be conducted at a temperature from about 30°C. to about 150°C. with the higher temperature preferably being maintained below 100° C. and at the reflux temperature of the reactant solvent system. The second stage reduction is conducted with a reducing agent such as sodium borohydride or zinc powder in refluxing glacial acetic acid. Other reducing techniques are applicable and may be employed to effect the conversion of the disulfide linkage to the desired mercaptan group.

The so derived ortho-mercapto compounds, in the free mercaptan form or as an alkali metal salt thereof may be converted to the desired salt by reaction with the free base containing the desired salt forming group.

Thus an amine or amidine salt of the mercaptan may be produced by the reaction:

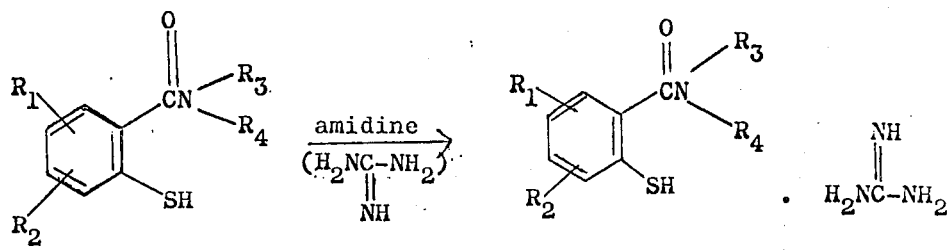

Amidine derivatives other than that depicted, e.g.

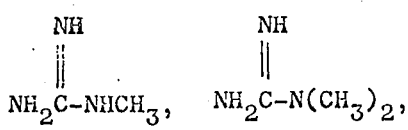

and the like, may be employed to produce the desired salts. Likewise, the alkali metals, alkaline earth metals, alkaline earth metals and transition metals form desirable salts with the ortho-mercaptobenzoyl amides of this invention. Various amines such as pyrrolidine, piperidine, piperazine, and the like, may be employed as the salt forming cation. Thus, the sodium salt of 1-(ortho-mercaptobenzoyl)-pyrrolidine or the free mercaptan may be converted to the piperazine salt by methods known to the art to provide a very desirable form of the compound for administration.

Recently, it has been established that at least one form of hyperglycemia is produced by reduced insulin B-chain albumin complex, the latter serving to block, in some unknown way, the function of insulin in vivo (Diabetes 17:1, 1968). This form of hyperglycemia seems to be more prevalent in the elderly, although it is not limited to any age group, and may be considered a chemically induced maturity onset hyperglycemia.

Although applicants do not intend to be bound by any specific theory or mode of action, the hypoglycemic effect induced in a warm-blooded animal by the compounds of this invention is hypothesized to result from inhibition of insulin B-chain induced hyperglycemia. An especially beneficial response is available in cases involving maturity onset diabetes where a residual insulin producing ability still exists, the compounds of this invention preventing inhibition of insulin activity endogenously provided.

The hypoglycemic agents of this invention are administrable either orally, intramuscularly or intraperitoneally. The amount of the active compound needed to reduce blood sugar to acceptable levels varies with the mode of administration as well as with the weight of the individual under treatment and the unique response of the patient relative to age, severity of blood sugar concentration and the latent or recoverable insulin producing capability of the patient.

The compounds of this invention have no observable effect on insulin or other known hypoglycemic agents such as tolbutamide, chlorpropamide and phenformin and may supplement or be supplemented by other blood sugar lowering compounds to produce a desired effect. Likewise, a suitable adjuvant such as a diluent, lubricant, solvent, buffer, and the like, may be incorporated into the vehicle used for administration of unit dosage formulations.

The compounds of this invention are water soluble and directly administrable in aqueous solution. As solids, the compounds of this invention may be formulated into unit dosage form in typical combinations such as:

TABLET COMPOSITION (weight/weight)

| | |
|---|---|
| N-Amidino-4-fluoro-2-mercapto-benzamide | X% |
| Avicel (microcrystalline cellulose) | 15–25% |
| Mg Stearate | 0.5% |
| Lactose | q.s. ad. 100% |

CAPSULE COMPOSITION (% by weight)

| | |
|---|---|
| N-Amidino-4-fluoro-2-mercapto-benzamide | X% |
| Mg Stearate | 1–5% |
| Lactose or Talc | q.s. ad. 100% |

INJECTIBLE SOLUTIONS FOR VIALS (% wt/vol)

| | |
|---|---|
| N-Amidino-4-fluoro-2-mercapto-benzamide | X% |
| Anti-oxidant | 0.5–2.5% |
| NaOCOCH$_3$. HOCOCH$_3$ buffer | |
| H$_2$O or Propyleneglycol | q.s. ad. 100% |

Where one of the free mercaptan containing compounds of this invention is an oil, conversion to one of the various salt forms is advisable, in whole, in part, or by forming a mixture of the oil and one of its salts, to afford a solid material for dry compounding.

The activity of the claimed compounds was initially determined by both in vitro and in vivo studies. Following the procedures reported in Biochemistry 5:461–466 (1966) and Nature 213:515–516 (1967), said articles being incorporated herein by reference. The hypoglycemic activity of the claimed compounds was established at oral dosage levels as low as 5 milligrams per kilogram body weight in rates for N-amidino-4-fluoro-2-mercaptobenzamide.

The in vitro testing was performed by preparing mitochondria from the livers of male Sprague-Dawley rats, (150–250 grams body weight) that had been fasted 18 hours, by a standardized differential centrifugation procedure. The effect of reduced insulin B-chain complexed with albumin (0.9 mg of each in 5 ml test system) on the inhibition of the mitochondrial swelling of insulin (5 × 10$^{-6}$ moles) was determined in a Beckman Model B spectrophotometer at 520 m$\mu$. Insulin, reduced insulin B-chain and albumin were suspended in pH 7.3, 0.125 M KCl-0.02 M Tris-0.1% partially hydrolyzed gelatin buffer, so that the specified weight or molar concentration of these agents was contained in 5 ml of buffer. Compounds to be tested for their ability to block the B-chain inhibition were incorporated in the tubes containing the B-chain, albumin and insulin. The B-chain-albumin-insulin system was also run without the compound, and these same agents were also run by themselves. The solutions were placed in matched 15 × 100 mm test tubes and stock mitochondrial suspension was added to the 5 ml of KCl-Tris buffer in which they were contained to give an initial optical density of 0.49.–0.52. The same concentration of albumin was added to the tubes that did not contain any reagent as was present in the other tubes, and all experimental and control determinations were run in triplicate. The increased average change in optical density of the tubes containing insulin, reduced B-chain-albumin, and compound, above that of the tubes containing all of these reagents except the compound under study, served as a measure of activity of the compounds. The greater the optical density change within experimental limits and the lower the concentration of the compound necessary to produce this change the greater the activity of the compound. All compounds were studied initially at $7.5 \times 10^{-5}M$ and an increase in optical density of $50 \times 10^{-3}$ at 10 minutes, $60 \times 10^{-3}$ at 20 minutes and $30 \times 10^{-3}$ at 30 minutes was considered to be the minimal requirement for activity.

The in vivo testing was performed with rates in a diabetic-like state, that had been maintained for 7 days on a high fat, high protein diet, to determine the effect of reduced insulin B-chain complexed with albumin in elevating the blood sugar levels. These rats are more sensitive to B-chain induced hyperglycemia and generate insignificantly elevated glucose levels.

After an 18 hour fast the rats were injected intraperitoneally with 1 mg of reduced B-chain complexed with an equal weight of albumin, or 1 mg of albumin alone. A second injection of either the same amount of reduced B-chain and albumin, or albumin alone was given 30 minutes later. Blood samples for blood sugar analysis were obtained before the first and second injections as well as 60 and 90 minutes after the first injection. Rapidly increasing glucose values over the control values were observed at the 30 and 60 minutes time intervals with a slight fall off at 90 minutes. In assessing the activity of the drugs, after taking the control blood sample, the drug compound was administered orally, usually at 30 mg. per kg. After 20 minutes, to allow for absorption of the compound, a second blood sample was drawn and the animal given B-chain following the procedure described above.

Based upon all the available data, the compounds, claimed, infra, are useful in reducing the blood sugar concentration in warm-blooded animals. The dose size and administration regimen is readily determinable by those skilled in the art depending upon the animal species, size, degree of the hyperglycemic state, etc. by administering scaled doses, while periodically examining the host blood analysis and other physical signs of activity. No use negating toxic side effects have been observed, to date, upon administration of these compounds to standard test animals.

In addition to the hypoglycemic activity of the compounds of this invention, several members of the group of compounds exhibit anti-inflammatory activity namely 2,2'-dithiobis(N-methylbenzamide), N,N-diethyl-o-mercaptobenzamide, 1,4-bis(o-mercaptobenzoyl) piperazine and 2,2'-dithiobis(N,N-dimethylbenzamide).

The anti-inflammatory activity of the compounds was determined by in vitro tests based upon inhibition of albumin denaturation, acceleration of the disulfide-sulfhydryl interchange in albumin and inhibition of aldehyde binding to albumin (see Grant et al., Biochemical Pharmacology, Vol. 20, (1971). The compounds were active anti-inflammatory agents at concentrations 0.001 millimolar and above.

The compounds induce some central nervous system depressant response and analgesic effects with minor mydriasis and convulsant side effects under general screening techniques.

The following examples are presented to illustrate the way in which compounds of this invention were prepared without intending to limit the tangible or intangible aspects of the invention. After each example, the mitocondrial study data and in vivo data is provided to indicate the minimal concentration and dosage, respectively, for achieving from moderate to marked activity of the compound tested.

EXAMPLE I 4,4'[Dithiobis(o-phenylenecarbonyl)]dimorpholine

To a refluxing solution of dithiosalicycloyl dichloride (12.3 g., 0.04 mole) in benzene (400 ml.) is added morpholine (14.0 g., 0.16 mole) in benzene (25 ml.) dropwise and the mixture is refluxed for 1 hour. The solvent is removed under vacuum and the residue is dissolved in methylene chloridewater. The organic phase is separated and the aqueous layer is extracted with methylene chloride. The combined organic layers are successively washed with dilute hydrochloric acid, dilute potassium carbonate, water, saturated salt solution and dried with sodium sulfate. The solvent is removed under vacuum to give an oil (15.5 g.) which subsequently crystallizes. Recrystallization of the product from benzene-cyclohexane gives white crystals (11.5. 65% yield), m.p. 146°–148°C. (uncorr.).

Elemental Analysis: $C_{22}H_{24}N_2O_4S_2$
Calc'd:   C, 59.44; H, 5.44; N, 6.30.
Found:   C, 59.26; H, 5.44; N, 6.27.
0.075 millimolar concentration - marked activity.
30.0   milligrams per kilogram   - marked activity.

EXAMPLE II

N,N-Diethyl-o-mercaptobenzamide.

2,2'Dithiobis(N,N-diethylbenzamide) (12.8 g., 0.0307 mole) is dissolved in absolute ethanol (75 ml.) at 65°–70°C. and a mixture of sodium borohydride (2.35 g., 0.0614 mole) in absolute ethanol (50 ml.) is added to the solution in dropwise manner. The mixture is heated at 75°–80°C. for 1 hour, poured into ice water (50 ml.), and the pH is adjusted to 11 with sodium hydroxide. The aqueous solution is washed with diethyl ether and cooled to 5°C. with ice. The pH is lowered to 3 with hydrochloric acid under nitrogen and the solution is extracted twice with diethyl ether. The ether layer is washed successively with water, saturated salt solution, dried with sodium sulfate, and evaporated under vacuum, to give an oil that crystallized (10.0g., 78% yield), m.p. 56°–60°C. (uncorr.). The solid is recrystallized from hexane to give white crystals (8.6 g.), m.p. 58°–60°C. (uncorr.).

Elemental Analysis: $C_{11}H_{15}NOS$
Calc'd:   C, 63.12; H, 7.22; N, 6.69.
Found:   C, 63.30; H, 7.34; N, 6.64.
0.075 millimolar - marked activity
30.0 milligrams per kilogram - marked activity

EXAMPLE III o-Mercapto-N,N-dimethylbenzamide 2,2'-Dithobis(N,N-dimethylbenzamide) (6.1 g., 0.017 mole) is stirred in absolute ethanol (50 ml.) at 65°–70°C. and a mixture of sodium borohydride (1.3 g., 0.034 mole) in absolute ethanol (30 ml.) is added in dropwise manner. The solution is reacted and worked-up in the manner of Example II to given an oil which crystallized (4.3 g., 70% yield), m.p. 37°–44°C. (uncorr.). The solid is recrystallized from hexane to give white crystals 2.2 g., 36% yield), m.p. 42.5°–45°C. (uncorr.).

Elemental Analysis: $C_9H_{11}NOS$
Calc'd: C, 59.63; H, 6.12; N, 7.73.
Found: C, 59.29; H, 6.14; N, 7.77.

0.075 millimolar - marked activity
30.0 milligrams per kilogram - moderate activity

EXAMPLE IV o-Mercapto-N-methylbenzamide.

2,2'-Dithiobia(N-methylbenzamide) (7.3 g., 0.0216 mole) is dissolved in absolute ethanol (75 ml.) at 65–70°C. and a mixture of sodium borohydride (1.64 g., 0.0432 mole) in absolute ethanol (50 ml.) is added in dropwise manner. The solution is reacted and worked-up in a manner similar to Example II to give a solid product (5.5 g., 76% yield), m.p. 88°–92°C. (uncorr.). The solid is recrystallized from benzenecyclohexane to give white crystals (4.3 g.), m.p. 90°–92°C. (uncorr.).

0.075 millimolar - marked activity
30.0 milligrams per kilogram - moderate activity

EXAMPLE V

N-Amidino-4-fluoro-2-mercaptobenzamide.

Guanidine hydrochloride (32.5 g., 0.33 mole) was added to 16.2 g (0.3M) sodium methoxide in 125 ml methanol and warmed to 50°C. for 45 min. and filtered through a medium sintered glass filter. This solution was then added to a solution of methyl 4-fluoro-2-mercaptobenzoate (11.1 g, 0.06 mole) in 50 ml methanol containing 3.24 g (0.06 mole) sodium methoxide. The solution was heated on the steam bath for 15 min. and allowed to stand at room temperature overnight. The methanol was removed at 60°–70°C. using a vacuum pump, and the residue dissolved in 150 ml. water. The mixture was filtered and the pH brought to 9.8 with conc. HCl. giving a yellow precipitate (14.7 g), m.p. 240°–250°C. dec. The solid was stirred at 0°–5°C. with pH 13.5 base, filter off an insoluble solid, and acidifiy to pH 9.7 and filter off the product. The solid was dried at 80°C. overnight in high vacuum, m.p. 286°–288°C. (decomp.).

Elemental Analysis for $C_8H_8FN_3OS$ M.W. 213.23
Calc'd: C, 45.06; H, 3.79; N, 19.71
Found: C, 45.18; H, 3.73; N, 19.44

0.075 millimolar - marked activity
15.0 milligrams per kilogram - marked activity

What is claimed is:

1. A method for altering the blood sugar concentration in a warm-blooded animal in need thereof which comprises administering to said animal a composition containing as an essential active ingredient at least one amide selected from the group consisting of N,N-di(lower)alkyl-o-mercapto-benzamide, N-(lower)alkyl-o-mercapto-benzamide, N-amidino-4-fluoro-2-mercapto-benzamide, and the pharmaceutically acceptable salts thereof, in an amount sufficient to reduce said blood sugar level.

2. The method of claim 4 in which said essential active ingredient is N,N-diethyl-o-mercaptobenzamide.

3. The method of claim 1 in which said essential active ingredient is N,N-dimethyl-o-mercaptobenzamide.

4. The method of claim 1 in which said essential active ingredient is N-methyl-o-mercaptobenzamide.

5. The method of claim 1 in which said essential active ingredient is N-amidino-4-fluoro-2-mercaptobenzamide.

* * * * *